(No Model.)  2 Sheets—Sheet 1.

W. H. FORD.
DRIVING AND STEERING ACTION FOR CYCLES.

No. 511,839. Patented Jan. 2, 1894.

WITNESSES
H. A. Lamb
Pearl Reynolds

INVENTOR
William H. Ford
By A. M. Wooster
Atty.

THE NATIONAL LITHOGRAPHING COMPANY,
WASHINGTON, D. C.

(No Model.) 2 Sheets—Sheet 2.
W. H. FORD.
DRIVING AND STEERING ACTION FOR CYCLES.
No. 511,839. Patented Jan. 2, 1894.
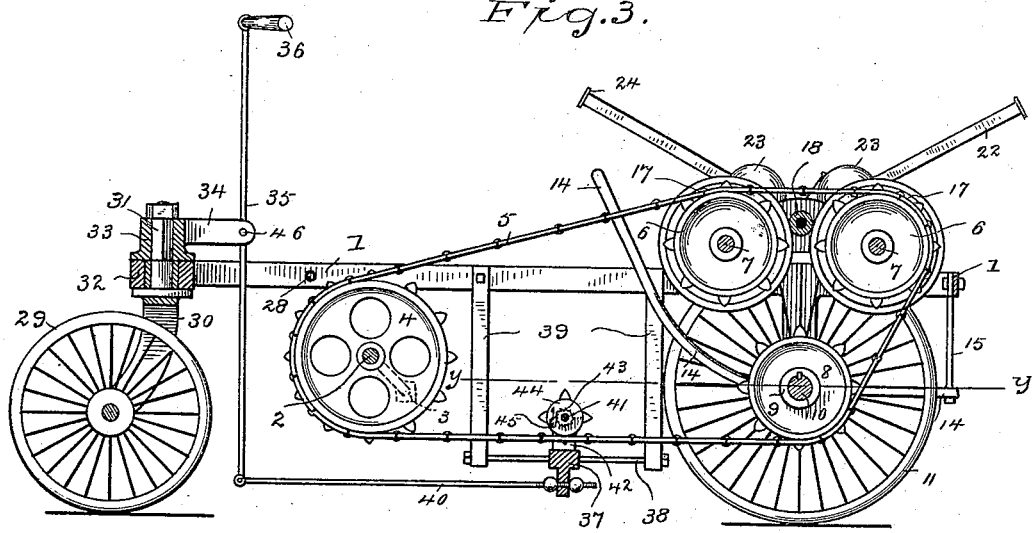
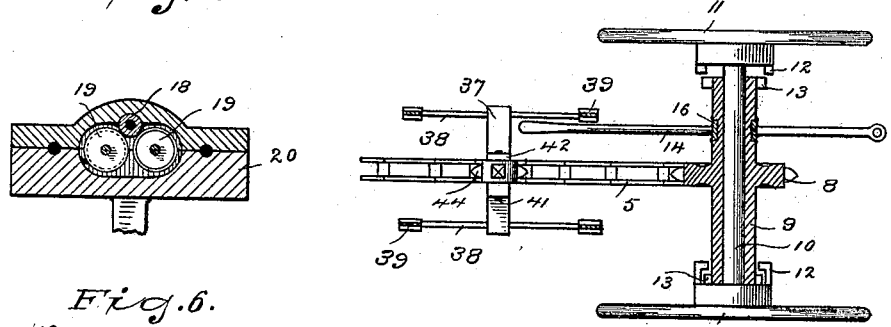
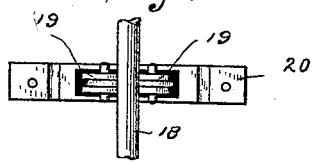
WITNESSES
H. A. Lamb
Pearl Reynolds
INVENTOR
William H. Ford
By A. M. Wooster
Atty.

UNITED STATES PATENT OFFICE.

WILLIAM H. FORD, OF SHELTON, CONNECTICUT.

DRIVING AND STEERING ACTION FOR CYCLES.

SPECIFICATION forming part of Letters Patent No. 511,839, dated January 2, 1894.

Application filed July 21, 1893. Serial No. 481,097. (No model.)

*To all whom it may concern:*

Be it known that I, WILLIAM H. FORD, a citizen of the United States, residing at Shelton, in the county of Fairfield and State of Connecticut, have invented certain new and useful Improvements in Driving and Steering Actions for Cycles; and I do hereby declare the following to be a full, clear, and exact description of the invention, such as will enable others skilled in the art to which it appertains to make and use the same.

My invention has for its object to provide driving and steering mechanism for cycles, whether provided with two, three or four wheels, which shall be so constructed that while the machine is running upon level ground or down hill, power shall be stored to assist in driving the machine whenever an up grade is reached, or by a slight movement the driving mechanism can be disengaged from the driving wheels so that power may be stored by movement of the driving mechanism while the machine is standing still, and in which the steering mechanism shall be combined with means for driving the machine by hand power which may be used alternately with the foot power, that is to say I provide two independent driving mechanisms one of which is combined with a steering mechanism, either of which may be used as preferred or they may be used alternately to rest the rider in long distance riding, but little exertion with the hand power being required to keep the machine in motion upon a level grade after power has been stored up. In order to accomplish these results in a simple and inexpensive manner and to provide a strong and durable machine embodying the principle of my invention I have devised the novel construction which I will now describe referring by numbers to the accompanying drawings forming part of this specification in which I have illustrated my invention as applied to a tricycle, this single application of my invention being deemed sufficient for the purposes of this specification.

Figure 1:
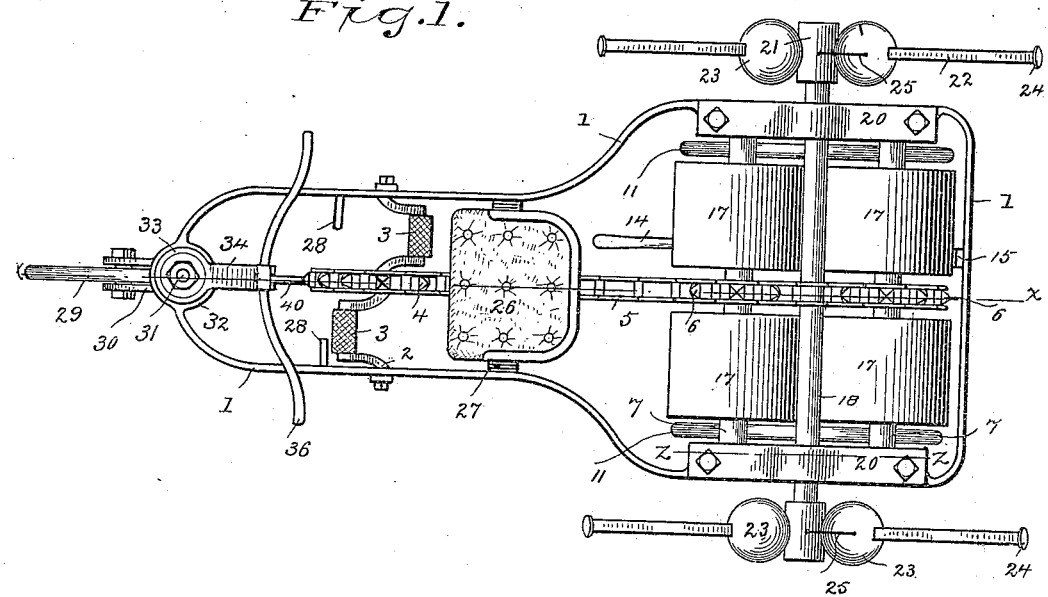
Figure 2:
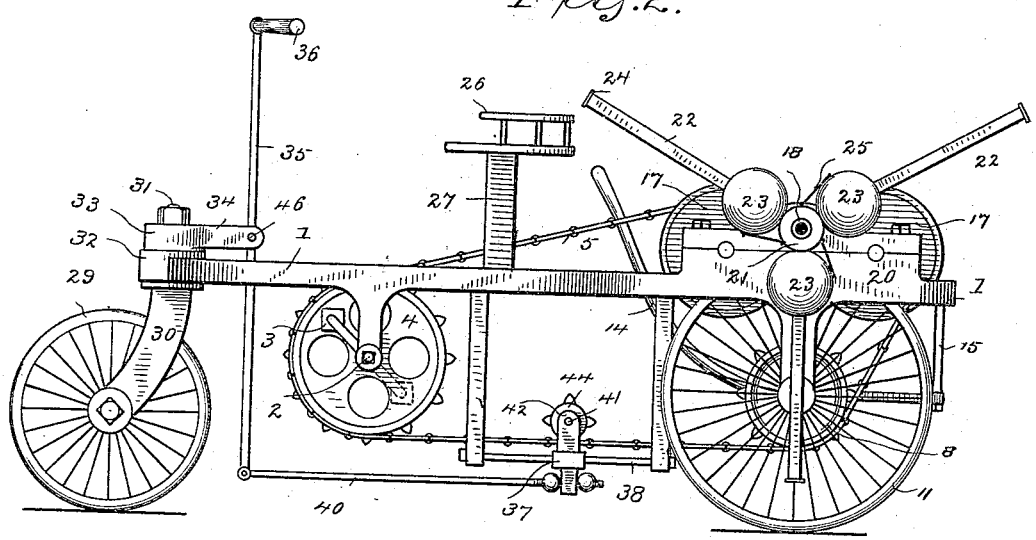

Figure 1 is a plan view of a tricycle embodying my novel improvements; Fig. 2 a side elevation thereof; Fig. 3 a section on the line $x\,x$ in Fig. 1; Fig. 4 a section on the line $y\,y$ in Fig. 3 looking down; Fig. 5 a detail sectional view on the line $z\,z$ in Fig. 1, and Fig. 6 is a plan view of one of the boxes of the power shaft with the cap piece removed.

1 denotes the frame of the machine the lines of which may be varied to an almost unlimited extent without departing from the principle of my invention.

2 denotes the driving shaft to which power may be applied in any ordinary or preferred manner, as for example by pedals 3.

4 denotes a sprocket wheel carried by the driving shaft, and 5 a sprocket chain which passes over sprocket wheel 4, over sprocket wheels 6 carried by shafts 7 journaled in the rear portion of the frame, and over a sprocket wheel 8 carried by a sleeve 9 adapted to slide longitudinally on a shaft 10 which carries the driving wheels 11 of the machine. The hubs of these wheels are provided on their inner sides with clutch members 12 which are adapted to be engaged by clutch members 13 at the ends of sleeve 9. In the position illustrated in Fig. 4 the sleeve is wholly disengaged from shaft 10 so that movement of the driving shaft and the several sprockets will not communicate motion to shaft 10 and the main wheels, all of which will presently be more fully explained. Sleeve 9 is controlled to connect and disconnect it from shaft 10 by means of a lever 14 the free end of which extends forward into a convenient position to be manipulated by the rider, the rear end thereof being pivoted to an arm 15 extending downward from the rear end of the frame.

16 denotes a collar lying in a groove in sleeve 9, said collar being loose enough to permit the sleeve to turn freely but being itself connected to lever 14 so that while the sleeve must at all times move with the chain, no movement will be communicated to the shaft except when the sleeve is moved to the reverse position from that shown in Fig. 4 so as to place the clutch members in engagement.

17 denotes drums carried by shaft 7 the faces of which are covered with leather.

18 denotes a shaft which is termed the power shaft. This shaft rests upon anti-friction rollers 19 in boxes 20 on the frame, and lies in contact with the leather covered peripheries of drums 17. As motion is imparted to these drums whenever the sprocket chain is moved it naturally follows that the drums must impart rapid rotation to shaft 18.

At the outer ends of shaft 18 are hubs 21 from which extend radial arms 22. 23 denotes weights carried by these arms but free to slide thereon, the outer ends of the arms being provided with heads 24 to prevent the weights from being thrown off by centrifugal force when the shaft is rotating at a high rate of speed.

25 denotes springs connected to the hubs and to the weights which normally hold the weights in contact with the hubs and are graduated to partially overcome the centrifugal force generated by the rotation of the shaft so as to prevent the weights from moving out too quickly on the arms. Either rubber or coil springs may be used as preferred, the former being indicated in the drawings.

The seat which I have indicated by 26 may be supported in any suitable manner. I have shown it as carried by a curved cross piece 27 which extends between the side pieces of the frame.

28 denotes foot rests upon the frame which may be used by the rider when not driving the machine by foot power.

29 denotes the steering wheel journaled in a yoke 30 whose shank 31 is journaled in a head 32 at the forward end of the frame. The upper end of the shank is made angular to adapt it to receive a collar 33 and hold it against turning independently of the shaft.

34 denotes an arm which extends backward from this collar and is provided at its end with a yoke in which is pivoted a rod 35 carrying a handle bar 36.

37, see Figs. 3 and 4, denotes a slide which is adapted to move on rods 38 themselves carried by hangers 39 depending from the frame.

40 denotes a connecting rod one end of which is pivoted to rod 35 the other being adjustably connected to the slide.

41 denotes a shaft journaled in standards 42 on the slide and carrying a ratchet 43 rigidly secured thereto and a sprocket wheel 44 which is loose on the shaft and carries a pawl 45, see Fig. 3, which engages the ratchet.

Under ordinary circumstances, that is when the machine is being run by foot power, sprocket wheel 44 will be carried by the chain and will turn upon the shaft the pawl slipping over the teeth of the ratchet.

It will be understood from the description already given that the handle bar and rod 35 have two movements, one being the steering movement which is performed by swinging the handle bar and rod in an arc of a circle of which shank 31 is the center. This movement will of course turn steering wheel 29 and guide the machine as is common in tricycles having a single wheel in front. The other movement is a forward and back rocking movement of the handle bar and rod, the rod oscillating on its pivot which for convenience I designate 46, at the outer end of arm 34.

This oscillatory movement of rod 35 imparts longitudinal reciprocatory movement to connecting rod 40 and moves the slide forward and backward on rods 38. When the slide is moved forward, i. e. when the handle bar is drawn backward, toward the rider sitting in the seat, sprocket wheel 44 will turn freely on this shaft, very slight use of power on the part of the rider being required to make this movement. When the backward movement takes place, i. e. the pushing movement on the part of the rider, sprocket wheel 44 will be locked to shaft 41 by means of the pawl and ratchet so that when power is applied to move the slide backward the slide can only move by drawing the sprocket chain with it, the latter being of course fitted to the several sprocket wheels and carrying them with it. Movement is thus imparted to the sprocket chain and by means of the connections already described, to the power shaft and sleeve 9, and after the clutch members have been placed in engagement, to the driving wheels of the machine.

I will now briefly describe the operation of the entire machine. Suppose the rider desires to run the machine by foot power in the ordinary way. Sleeve 9 is thrown to the reverse position from that shown in Fig. 4 by means of lever 14 thereby placing the clutch members in engagement and connecting sleeve 9 with the driving wheels. This position of the parts is not shown in the drawings as it will be obvious that it is merely an alternate position from that illustrated in Fig. 4. The operation of the machine is now similar to the operation of any ordinary machine of this class except that weights 23 will be thrown outward on the radial arms by centrifugal force thus storing up momentum which does not add to any appreciable extent to the power required to drive the machine on a level grade, but which will assist the rider very greatly by means of the stored up momentum in driving the machine upon an up grade.

Should the rider desire to use hand power instead of foot power he simply places his feet upon the rests 28 and moves the handle bar and rod 35 forward and backward with a rocking movement on pivot 46.

Suppose now that the rider desires to store up power while the machine is stationary. By means of lever 14 he moves the clutch members to the position shown in Fig. 4 thereby wholly disconnecting the sleeve from shaft 10 and the driving wheels, and by either the hand movement or the foot movement and the connections already described, imparts a high rate of speed to power shaft 18, the effect of which is to cause weights 23 to move outward upon arms 22 thereby storing up momentum which may be applied to drive the machine or to assist in driving it when the clutch members are placed in engagement thereby locking the driving mechanism to the driving wheels. It will be apparent that in coasting the rider may disconnect the driving mechanism or not as he chooses. It is obvious that if the driving mechanism is disconnected the machine will coast with perfect freedom. If on the other hand the rider desires to store up power it is obvious that he can do so while coasting by simply leaving the driving mechanism connected to the driving wheels.

Having thus described my invention, I claim—

1. The combination with a shaft having driving wheels fixed thereto and provided with clutch members, and a sleeve on said shaft having corresponding clutch members and a sprocket wheel, of shafts 7 carrying sprocket wheels 6 and drums 17, shaft 18 adapted to receive motion from said drums and carrying radial arms, weights on said arms adapted to be moved outward by centrifugal force, springs whereby said weights are normally held inward, and a sprocket chain engaging the sprocket wheels whereby movement is imparted to the power shaft and sleeve to store up momentum when the clutch members are disconnected, and to drive the machine when they are connected.

2. The combination with shaft 10, the driving wheels secured thereto and having clutch members and sleeve 9 provided with corresponding clutch members and a sprocket wheel, of shafts 7 carrying sprocket wheels and drums 17, power shaft 18 provided at each end with radial arms, weights on said arms adapted to be moved outward by centrifugal force, springs which normally hold said weights inward, and a sprocket chain engaging the sprocket wheels and imparting motion thereto.

3. The combination with shaft 10, the driving wheels fixed thereto and provided with clutch members, sleeve 9 having corresponding clutch members and a sprocket wheel, shafts 7 also carrying sprocket wheels and having drums 17, shaft 18 having movable weights and arms and a sprocket chain engaging said sprocket wheels, of slide 37 carrying shaft 41, sprocket wheel 44 loose on said shaft and engaging the sprocket chain, a ratchet fixed to the shaft, a pawl pivoted to the sprocket wheel and engaging the ratchet, and suitable means for moving the slide backward and forward so that when moved in one direction the sprocket will engage the chain and carry it along, and when moving in the other direction the sprocket will turn and the pawl slip over the teeth of the ratchet.

4. The combination with arm 34 and rod 35 pivoted thereto to swing in the vertical plane and carrying a handle bar, of sprocket chain 5, horizontal slide 37 carrying sprocket wheel 44 loose thereon, ratchet 43 secured to said shaft, a pawl secured to the sprocket wheel and engaging the ratchet, and a rod connecting the slide to rod 35.

5. In a cycle the combination with the steering wheel, shank 31 by which it is carried, and arm 37 extending from said shank, of sprocket wheels 4, 6 and 8, sprocket chain 5, slide 37 carrying a sprocket wheel 44, a pawl and ratchet connection between said sprocket wheel and the slide, and a rod 35 pivoted in arm 34 and having at its upper end a handle bar and at its lower end a rod connecting it to the slide so that the handle bar and rod 35 may be used either to propel the machine or to steer it.

6. The combination with shaft 10 carrying the driving wheels, sleeve 9, and clutch mechanism adapted to connect and disconnect said sleeve and shaft, of sprocket wheels 4, 6 and 8, a chain passing over said wheels, drums 17, power shaft 19 engaging said drums and carrying radial arms with sliding weights thereon, slide 37 carrying sprocket wheel 44 also engaging the sprocket chain and having a pawl and ratchet connection with the slide, suitable pedals by which the chain may be driven, rod 35 carrying the handle bar, and rod 40 connecting said rod to the slide so that the chain may be driven by hand power if preferred.

In testimony whereof I affix my signature in presence of two witnesses.

WILLIAM H. FORD.

Witnesses:
A. M. WOOSTER,
PEARL REYNOLDS.